United States Patent
Tan et al.

(10) Patent No.: US 11,709,912 B2
(45) Date of Patent: Jul. 25, 2023

(54) ABNORMALITY DETECTION

(71) Applicant: HANGZHOU DPTECH TECHNOLOGIES CO., LTD., Zhejiang (CN)

(72) Inventors: Tian Tan, Hangzhou (CN); Zhongliang Chen, Hangzhou (CN); Xiaolong Li, Hangzhou (CN)

(73) Assignee: Hangzhou DPtech Technologies Co., Ltd., Hangzhou (CN)

( * ) Notice: Subject to any disclaimer, the term of this patent is extended or adjusted under 35 U.S.C. 154(b) by 70 days.

(21) Appl. No.: 17/135,799

(22) Filed: Dec. 28, 2020

(65) Prior Publication Data

US 2021/0203683 A1    Jul. 1, 2021

(30) Foreign Application Priority Data

Dec. 30, 2019    (CN) .......................... 201911404370.0

(51) Int. Cl.
  *G06F 17/18*    (2006.01)
  *G06F 11/30*    (2006.01)
  *G06F 11/34*    (2006.01)

(52) U.S. Cl.
  CPC .......... *G06F 17/18* (2013.01); *G06F 11/3058* (2013.01); *G06F 11/3452* (2013.01); *G06F 11/3476* (2013.01)

(58) Field of Classification Search
  CPC .. H04L 63/1425; H04L 43/10; G06F 11/3058; G06F 11/3452; G06F 11/3476; G06F 17/18
  See application file for complete search history.

(56) References Cited

U.S. PATENT DOCUMENTS

| | | | |
|---|---|---|---|
| 2010/0030544 A1* | 2/2010 | Gopalan | ............... H04L 41/142 703/13 |
| 2019/0129821 A1* | 5/2019 | Lee | .......................... G06F 17/15 |
| 2021/0026698 A1* | 1/2021 | Lemberg | ............. G06F 11/3006 |

FOREIGN PATENT DOCUMENTS

| | | | | |
|---|---|---|---|---|
| CN | 105162994 A | * | 12/2015 | |
| CN | 105577402 A | * | 5/2016 | |
| CN | 107515889 A | * | 12/2017 | ......... G06F 16/9535 |

(Continued)

OTHER PUBLICATIONS

Laptev et al., "Generic and Scalable Framework for Automated Time-series Anomaly Detection" 2015 ACM (Year: 2015).*

(Continued)

*Primary Examiner* — John C Kuan
(74) *Attorney, Agent, or Firm* — McCoy Russell LLP

(57) ABSTRACT

A method of detecting abnormality may include the following steps. A normal-value range of a parameter for a target object is determined based on historical values of the parameter in a preset time period or at a preset time point. Whether the target object is abnormal is determined based on the normal-value range and the value of the parameter for the target object in the preset time period or at the preset time point within a current time cycle. Further, another normal-value range may be determined based on historical deviation values for the target object in historical time periods or at historical time points before the preset time period or the preset time point. Whether the target object is abnormal is determined based on either of the two normal-value ranges.

9 Claims, 5 Drawing Sheets

(56) References Cited

FOREIGN PATENT DOCUMENTS

| CN | 107766533 | A | * | 3/2018 | .......... G06F 11/3034 |
| CN | 108038040 | A | * | 5/2018 | .......... G06F 11/3006 |
| CN | 109818976 | A | | 5/2019 | |
| CN | 110377447 | A | | 10/2019 | |

OTHER PUBLICATIONS

State Intellectual Property Office of the People's Republic of China, Office Action and Search Report Issued in Application No. 201911404370.0, dated Mar. 20, 2023, 14 pages. (Submitted with Machine Translation).

* cited by examiner

ABNORMALITY DETECTION

CROSS REFERENCE TO RELATED APPLICATIONS

The present application claims priority to Chinese Patent Application No. 201911404370.0 filed on Dec. 30, 2019. The entire content of the above-listed application is hereby incorporated by reference for all purposes.

TECHNICAL FIELD

The present disclosure relates to the field of network security, and in particular, to a method and an apparatus for detecting abnormality, an electronic device, and a non-transitory computer-readable storage medium.

BACKGROUND

Generally, in a network environment, a majority of network flows (that is, data transmitted over the network) are normal network flows with a certain pattern, and the rest of the network flows may be abnormal network flows that differ significantly from the normal network flows. These abnormal network flows may be flows generated by a network attack. Therefore, the detection of the abnormal network flows may provide a basis for network security management, which may help to effectively identify, prevent, and resolve network attacks.

In addition, with more and more functions provided by an electronic device, the internal structure of the electronic device becomes more complex, which may make the stability of the electronic device worse. Therefore, it is important to monitor the operation of the electronic device in order to discover the abnormality of the electronic device in time.

SUMMARY

According to a first aspect of the present disclosure, there is provided a method of detecting abnormality. The method includes: obtaining a value of a parameter for a target object in a preset time period or at a preset time point within a current time cycle; determining a first normal-value range corresponding to the obtained value of the parameter, wherein the first normal-value range is determined by historical values of the parameter for the target object in the preset time period or at the preset time point within historical time cycles; determining a second normal-value range corresponding to the obtained value of the parameter, wherein the second normal-value range is defined by an intermediate value and a deviation value for the target object in the preset time period or at the preset time point, the intermediate value is determined by the historical values of the parameter, the deviation value is obtained by prediction based on historical deviation values for the target object in a preset number of historical time periods or at a preset number of history time points before the preset time period or the preset time point within the current time cycle, each of the historical deviation values for the target object in each of the historical time periods or at each of the history time points is a difference between a first historical value of the parameter and a first intermediate value for the target object in the historical time period or at the historical time point; determining, in response to determining that the obtained value of the parameter does not match either of the first normal-value range and the second normal-value range, that the target object is abnormal.

According to a second aspect of the present disclosure, there is provided an electronic device, including: a processor; and a memory for storing instructions that are executable by the processor to perform operations including: obtaining a value of a parameter for a target object in a preset time period or at a preset time point within a current time cycle; determining a first normal-value range corresponding to the obtained value of the parameter, wherein the first normal-value range is determined by historical values of the parameter for the target object in the preset time period or at the preset time point within historical time cycles; determining a second normal-value range corresponding to the obtained value of the parameter, wherein the second normal-value range is defined by an intermediate value and a deviation value for the target object in the preset time period or at the preset time point, the intermediate value is determined by the historical values of the parameter, the deviation value is obtained by prediction based on historical deviation values for the target object in a preset number of historical time periods or at a preset number of history time points before the preset time period or the preset time point within the current time cycle, each of the historical deviation values for the target object in each of the historical time periods or at each of the history time points is a difference between a first historical value of the parameter and a first intermediate value for the target object in the historical time period or at the historical time point; determining, in response to determining that the obtained value of the parameter does not match either of the first normal-value range and the second normal-value range, that the target object is abnormal.

According to a third aspect of the present disclosure, there is provided a non-transitory computer-readable storage medium having computer instructions stored thereon, wherein the computer instructions are executable by a processor to perform operations including: obtaining a value of a parameter for a target object in a preset time period or at a preset time point within a current time cycle; determining a first normal-value range corresponding to the obtained value of the parameter, wherein the first normal-value range is determined by historical values of the parameter for the target object in the preset time period or at the preset time point within historical time cycles; determining a second normal-value range corresponding to the obtained value of the parameter, wherein the second normal-value range is defined by an intermediate value and a deviation value for the target object in the preset time period or at the preset time point, the intermediate value is determined by the historical values of the parameter, the deviation value is obtained by prediction based on historical deviation values for the target object in a preset number of historical time periods or at a preset number of history time points before the preset time period or the preset time point within the current time cycle, each of the historical deviation values for the target object in each of the historical time periods or at each of the history time points is a difference between a first historical value of the parameter and a first intermediate value for the target object in the historical time period or at the historical time point; determining, in response to determining that the obtained value of the parameter does not match either of the first normal-value range and the second normal-value range, that the target object is abnormal.

DETAILED DESCRIPTION

Figure 1:
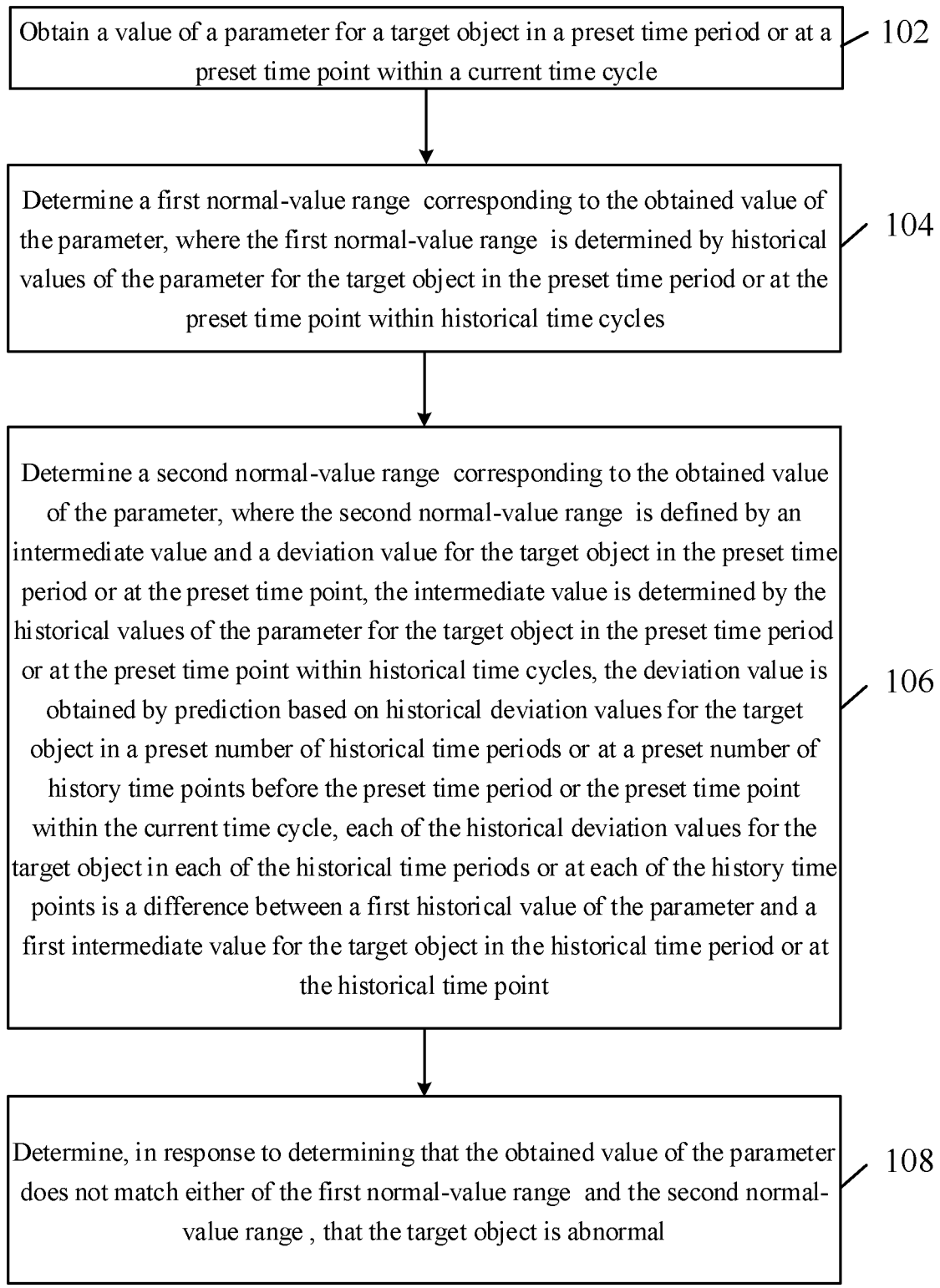
FIG. 1 is a flowchart illustrating a method of detecting abnormality according to exemplary embodiments of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality forms, unless clearly indicated otherwise in the context. It should also be understood that the term "and/or" as used herein includes any one of one or more associated listed items and all possible combinations thereof.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

FIG. 1 is a flowchart illustrating a method of detecting abnormality according to exemplary embodiments of the present disclosure. As shown in FIG. 1, the method may include steps 102~108.

At step 102, a value of a parameter for a target object in a preset time period or at a preset time point within a current time cycle is obtained.

In some embodiments, the target object may have multiple forms. For example, the target object may include: a flow or data a packet received by a preset host, a flow or a data packet from the preset host, a flow or a data packets received by a preset application in the preset host, a flow or a data packet from the preset application in the preset host, and any one of state parameters for the preset host. For example, a state parameter of the preset host may include: a CPU temperature, a CPU occupancy rate, a memory occupancy rate, a hard disk temperature, etc, and the preset host may be an execution device or devices other than the execution device.

Similar to the target object, the value of the parameter for the target object may also have multiple forms, such as a total value of flows or a number of data packets received by the preset host, a total value of flows or a number of data packets from the preset host, a total value of flows or a number of data packets received by the preset application in the preset host, a total value of flows or a number of data packets from the preset application in the preset host, a value of any one of state parameters for the preset host, a number of packets retransmissions or losses upon the preset host sending data, a number of connections for the preset host's Internet Protocol (IP) address as a source IP address, a number of connections for the preset host's IP address as a destination IP address, a maximum number of connections with a same source port for which the preset host's IP address functions as a destination IP address, and a maximum number of connections with a same destination port for which the preset host's IP address functions as a source IP address.

Regardless of the target object or the value of the parameter for the target object, the above examples are illustrative. The target object and the value of the parameter for the target object may be determined in light of actual needs.

In some embodiments, the obtaining of the value of the parameter for the target object in the preset time period or at the preset time point within the current time cycle may be real-time or non-real-time. Take the preset time period as an example. Assuming that the current time is 8:00, a value of the parameter for the target object corresponding to the time period "7:00-8:00" that has just passed may be obtained; a value of the parameter for the target object corresponding to the time period "1:00-2:00" that has passed long ago may be obtained. In other words, the preset time period or the preset time point in the present disclosure may be determined in light of actual needs.

At step 104, a first normal-value range corresponding to the obtained value of the parameter is determined, where the first normal-value range is determined by historical values of the parameter for the target object in the preset time period or at the preset time point within historical time cycles.

In some embodiments, a cycle model may be established based on the historical values of the parameter for the target object in the historical time cycles. In this way, during the determining of the first normal-value range, the cycle model for the target object may be obtained first, and the first normal-value range may be determined based on the obtained cycle model. The establishment of the cycle model may make the execution device unnecessary to save a large amount of historical values of the parameter, and make the execution device only necessary to save the cycle model to determine the first normal-value range, which reduces the storage space occupied by the historical values of the parameter.

On the basis of the establishment of the cycle model, when it is determined that the obtained value of the parameter is normal (that is, the target object is normal), the cycle model is updated based on the obtained value of the parameter to determine whether a value of the parameter for the target object in the preset time period or at the preset time point within a next time cycle is abnormal.

In some embodiments, the cycle model may present the historical values of the parameter for the target object in the historical time cycles in various forms. For example, the cycle model may include a parameter-value-probability distribution function corresponding to each time period or each time point. The determining of the first normal-value range based on the cycle model may include: extracting a probability distribution function for a parameter value in a preset time period or at a preset time point from the cycle model; and then determining a standard deviation and a mean value for the value of the parameter based on the extracted parameter-value probability distribution function, and the first normal-value range is obtained based on the standard deviation and the mean value. The method in which the cycle model presents the historical value of the parameter for the target object in the historical time cycle through the probability distribution function is only illustrative, and those skilled in the art may determine which method is used to present the historical values of the parameter for the target object in the historical time cycles in actual situation, which is not limited here.

It can be seen from the above process that when the cycle model presents the historical value of the parameter for the target object in the historical time cycle through the parameter-value probability distribution function, only the parameter-value probability distribution function, which corresponds to each time period or each time point, needs to be saved in the cycle model without saving a large amount of historical data. Updating the cycle model may include: when determining that the target object is normal, updating the parameter-value probability distribution function corresponding to the preset time period or the preset time point based on the obtained value of the parameter.

At step 106, a second normal-value range corresponding to the obtained value of the parameter is determined, where the second normal-value range is defined by an intermediate value and a deviation value for the target object in the preset time period or at the preset time point. The intermediate value is determined by the historical values of the parameter for the target object in the preset time period or at the preset time point within historical time cycles. The deviation value is obtained by prediction based on historical deviation values for the target object in a preset number of historical time periods or at a preset number of history time points before the preset time period or preset time point within the current time cycle. The historical deviation value for the target object in each historical time period or at each history time point is a difference between a first historical value of the parameter and a first intermediate value for the target object in the historical time period or at the historical time point.

In some embodiments, determining the second normal-value range may include the following two stages.

At the first stage, the intermediate value for the target object in the preset time period or at the preset time point is determined.

The intermediate value may be determined based on the historical values of the parameter for the target object in the preset time period or at the preset time point within the historical time cycles. To facilitate understanding, the preset time period is taken as an example. Assuming that the time cycle is 24 hours, the preset time period is "7:00-8:00", and there are 5 historical time cycles before the current time cycle (that is, 5 days before the current day), then the intermediate value may be determined based on the historical values of the parameter in the time period "7:00-8:00" within each of the previous 5 days. For example, a mean value of the historical values of the parameter in the time period "7:00-8:00" within each of the previous 5 days may be determined as the intermediate value.

At the second stage, the deviation value for the target object in the preset time period or at the preset time point is determined.

The deviation value may be obtained by prediction based on historical deviation values for the target object in a preset number of historical time periods or at a preset number of historical time points before the preset time period or the preset time point. There are many ways for the prediction. For example, after the historical deviation values are obtained, the obtained historical deviation values may be fitted to obtain a fitting curve, and the deviation value for the target object in the preset time period or at the preset time point may be predicted based on the obtained fitting curve.

The example in the first stage is still taken as an example. Further assuming that the preset number is 5, the historical deviation values in five time periods "2:00-3:00", "3:00-4:00", "4:00-5:00", "5:00-6:00", and "6:00-7:00", which are before the preset time period "7:00-8:00", may be obtained. Then the deviation value in the time period "7:00-8:00" may be predicted based on the obtained historical deviation values in the five time periods. For example, for the time period "2:00-3:00", it is assumed that the intermediate value for the target object in the time period "2:00-3:00" is 5 determined based on the historical values of the parameter in time period "2:00-3:00" within each of the previous 5 days. The historical value of the parameter for the target object in the time period "2:00-3:00" within the current day is 6, then the historical deviation value corresponding to the historical time period "2:00-3:00" may be obtained, that is 6−5=1. Assuming that the historical deviation values corresponding to five historical time periods "2:00-3:00", "3:00-4:00", "4:00-5:00", "5:00-6:00", and "6:00-7:00" are obtained in the above manners, and are 1, 2, 3, 2, and 4 respectively, then the deviation value corresponding to the preset time period "7:00-8:00" may be predicted based on these 5 historical deviation values.

At step 108, in response to determining that the obtained value of the parameter does not match either of the first normal-value range and the second normal-value range, the target object is determined to be abnormal.

For example, if the value of the parameter is not within the first normal-value range, the target object is determined to be abnormal. Or, if the value of the parameter is not within the second normal-value range, the target object is determined to be abnormal. Or, if the value of the parameter is neither within the first normal-value range nor within the second normal-value range, the target object is determined to be abnormal. Or, if the value of the parameter is not within an intersection of the first normal-value range and the second normal-value range, the target object is determined to be abnormal. Which way is used to determine whether the target object is abnormal may be determined depending on an actual situation.

As described above, according to some embodiments of the present disclosure, the first normal-value range for the target object in the preset time period or at a preset time point may be determined based on the historical values of the parameter for the target object within the historical time cycles. Whether the target object is abnormal is determined by determining whether the value of the parameter for the target object in the preset time period or at the preset time point within the current time cycle is within the first normal-value range. In other words, whether the target object is abnormal is determined by using a characteristic that the value of the parameter for the target object in the preset time period or at the preset time point does not change significantly in each time cycle.

In addition, the second normal-value range for the target object may be determined based on the deviation value and the intermediate value corresponding to the preset time period or the preset time point, where the deviation value corresponding to the preset time period or the preset time point is determined based on the historical deviation values for the target object in a preset number of the history time periods or history time points before the preset time period or the preset time point within the current time cycle. Whether the target object is abnormal is determined by determining whether the value of the parameter for the target object in the preset time period or at the preset time point within the current time cycle is within the second normal-value range. In other words, whether the target object is abnormal is determined by using a characteristic that there is a continuity in the deviation value for the target object in consecutive several time periods or at several time points.

For ease of understanding, methods according to some embodiments of the present disclosure are described below, using the example in which the target object is a flow received by an execution device, and the obtained value of the parameter is a size of the flow corresponding to a preset time period (referring to a total flow obtained by the execution device in the preset time period).

Figure 2:
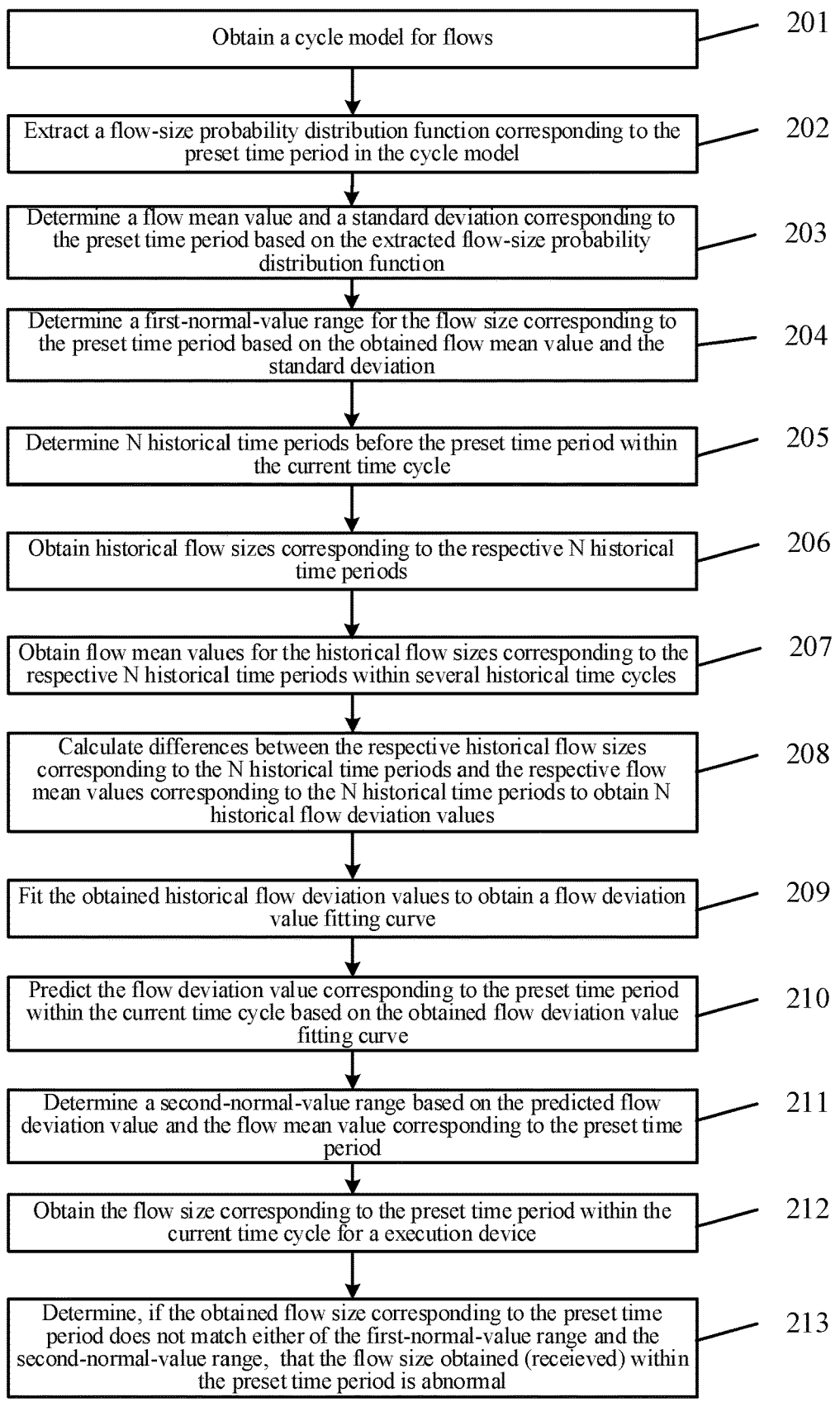
FIG. 2 is a flowchart illustrating a method of detecting flow abnormality according to exemplary embodiments of the present disclosure.

FIG. 2 is a flowchart illustrating a method of detecting flow abnormality according to exemplary embodiments of the present disclosure. The method may be applied to an electronic device, and may include steps 201-213.

At step 201, a cycle model for flows is obtained.

In some embodiments, the cycle model for flows includes several flow-size probability distribution functions, and each flow-size probability distribution function represents the probability distribution for a flow size in a time period within several historical time cycles. The cycle model may be expressed as: CM={pdf0, pdf1, pdf2, pdf3, pdf4, pdf5, . . . , pdfi}, where pdfi represents the flow-size probability distribution function in a ith time period, which may be used to express the probability that the flow size is a certain value in the ith time period. For example, assuming that 24 hours is a time cycle, each time cycle is divided into 24 time periods (i.e., 0≤i≤23), 5 time cycles have passed, and the time period "7:00-8:00" is the eighth time period, then the flow-size probability distribution function pdf8 in the time period "7:00-8:00" represents flow-size probability distributions corresponding to the time period "7:00-8:00" in the past 5 days.

In some embodiments, the cycle model may be established based on the flow sizes in the historical time cycles. With respect to processes of learning cycle model based on flow cache and determining whether the target object is in an abnormal state based on the cycle model, reference may be made to a logical block diagram shown in FIG. 3. It should be noted that the flow cache shown in FIG. 3 may have different meanings in different processes. In the process of learning the cycle model, the flow cache refers to a flow size received by an execution device in several historical time cycles. The process of learning the cycle model is to determine the flow-size probability distribution function corresponding to each time period based on the flow sizes in several historical time cycles.

At step 202, a flow-size probability distribution function corresponding to the preset time period in the cycle model is extracted. For example, if "7:00-8:00" is the preset time period, then pdf8 may be extracted from the above cycle model CM as the flow-size probability distribution function corresponding to the time period "7:00-8:00".

At step 203, a flow mean value and a standard deviation corresponding to the preset time period are determined based on the extracted flow-size probability distribution function. In the embodiment, after the flow-size probability distribution function corresponding to the preset time period is extracted, an expected value, that is, the mean value, may be obtained based on the extracted flow-size probability distribution function. Obtaining the expected value and the standard deviation through the probability distribution function is a conventional technical means for those skilled in the art, and will not be repeated here.

At step 204, a first normal-value range for the flow size corresponding to the preset time period is determined based on the obtained flow mean value and the standard deviation.

In some embodiments, when determining the first normal-value range based on the flow mean value and the standard deviation, an adjustment parameter may be applied to the standard deviation. For example, assuming that the first normal-value range is "X", the obtained flow mean value is "a", and the obtained standard deviation is "b", in a normal circumstance, the first normal-value range X is [a−b, a+b]. In order to obtain a more accurate detection result, the adjustment parameter γ may be introduced to make a certain fine adjustment to X. At this time, the first normal-value range X may be [a−γ*b, a+γ*b].

By introducing the adjustment parameter, when maintenance personnels of the execution device find that there is a deviation between a detection result of an abnormal flow and an actual situation, the adjustment parameter may be modified to improve the accuracy for detecting the abnormal flow. For example, when the maintenance personnels find that a missed detection rate of the abnormal flow (that is, the ratio of an abnormal flow that is not detected to an actual abnormal flow) is high, the adjustment parameter may be reduced to decrease the missed detection rate. On the contrary, when the maintenance personnels find that a false detection rate of the abnormal flow (that is, the ratio of a normal flow that is falsely detected as an abnormal flow to a total flow that is detected as the abnormal flow) is high, the adjustment parameter may be increased to reduce the false detection rate. As an example, a feedback module may be set in the execution device so that the maintenance personnels may modify the adjustment parameter through the feedback module.

At step 205, N historical time periods before the preset time period within the current time cycle are determined.

The "N historical time periods" here are the aforementioned "a preset number of historical time periods". If "7:00-8:00" is the preset time period, and N is 5, then the N historical time periods determined in the step 205 are "2:00-3:00", "3:00-4:00", "4:00-5:00", "5:00-6:00" and "6:00-7:00". As another example, assuming that the preset time period is "2:00-3:00", and N is still set to 5, then the determined N historical time periods are: "21:00-22:00 yesterday", "22:00-23:00 yesterday", "23:00-24:00 yesterday", "0:00-1:00" and "1:00-2:00".

At step 206, historical flow sizes corresponding to the respective N historical time periods are obtained.

At step 207, flow mean values for the historical flow sizes corresponding to the respective N historical time periods within several historical time cycles are obtained. In this embodiment, for each of the N historical time periods, the historical flow sizes corresponding to the historical time periods within several time cycles are obtained, and a mean value is calculated based on the obtained historical flow sizes.

For ease of understanding, the preset time period being "7:00-8:00" and N being 5 are still taken as an example. Assuming that the historical flow sizes in the five historical time periods within the five historical time cycles are shown in Table 1, then the flow mean values corresponding to the five historical time periods within the five historical cycles may be obtained, as shown in the last row of Table 1.

TABLE 1

| Historical time period | 2:00-3:00 | 3:00-4:00 | 4:00-5:00 | 5:00-6:00 | 6:00-7:00 |
|---|---|---|---|---|---|
| 5 days before | 2 | 3 | 4 | 5 | 4 |
| 4 days before | 4 | 5 | 6 | 5 | 4 |
| 3 days before | 3 | 5 | 6 | 4 | 5 |
| 2 days before | 4 | 5 | 5 | 5 | 5 |
| 1 day before | 2 | 4 | 6 | 4 | 5 |
| Flow mean value | 3 | 4.4 | 5.4 | 4.6 | 4.6 |

In some embodiments, the flow mean value may be used as the aforementioned intermediate value. Therefore, in order to obtain the flow mean value corresponding to any historical time period, it is not necessary to obtain the flow size corresponding to the historical time period within all historical cycles, but the flow-size probability distribution function corresponding to the historical time period may be used to determine the corresponding flow mean value. For example, when it is required to obtain the flow mean value corresponding to the historical time period "2:00-3:00", a flow-size probability distribution function corresponding to the historical time period "2:00-3:00" may be extracted from the cycle model. Then the flow mean value corresponding to the historical time period "2:00-3:00" may be calculated based on the extracted flow-size probability distribution function (that is, the expected value is found).

At step 208, differences between the respective historical flow sizes corresponding to the N historical time periods obtained in the step 206 and the respective flow mean values corresponding to the N historical time periods obtained in the step 207 are calculated to obtain N historical flow deviation values.

The preset time period being "7:00-8:00" and N being 5 are still taken as an example. Assuming that the historical flow sizes corresponding to the five historical time periods obtained in the step 206 are 3, 4, 6, 4, and 5, respectively, the flow mean values corresponding to the five historical time periods obtained in the step 207 are shown in the last row of Table 1. Then, five historical flow deviation values obtained in the step 208 are shown in Table 2 below.

TABLE 2

| Historical time period | 2:00-3:00 | 3:00-4:00 | 4:00-5:00 | 5:00-6:00 | 6:00-7:00 |
|---|---|---|---|---|---|
| Flow mean value | 3 | 4.4 | 5.4 | 4.6 | 4.6 |
| Historical flow size | 3 | 4 | 6 | 4 | 5 |
| Historical flow deviation value | 0 | −0.4 | 0.6 | −0.6 | 0.4 |

At step 209, the obtained historical flow deviation values are fitted to obtain a flow deviation value fitting curve.

In some embodiments, assuming that after the five historical flow deviation values in Table 2 are obtained, the five historical flow deviation values may be fitted to obtain the fitting curve. The flow deviation value corresponding to the preset time period may be predicted based on the obtained fitting curve.

In fact, in order to predict the flow deviation value corresponding to the preset time period based on each historical flow deviation value, a new model may be established by using a characteristic that the flow deviation value corresponding to each time period has continuity on time. This model may be referred to as time continuity model. The time continuity model may be expressed as: $\Delta_i = f(\Delta_{i-1}, \Delta_{i-2}, \Delta_{i-3}, \ldots, \Delta_{i-n})$, where, $\Delta_i$ represents the flow deviation value corresponding to the preset time period i; $\Delta_{i-1}, \Delta_{i-2}, \Delta_{i-3}, \ldots, \Delta_{i-n}$ represent the historical flow deviation values corresponding to the N historical time periods before the preset time period i.

Figure 3:
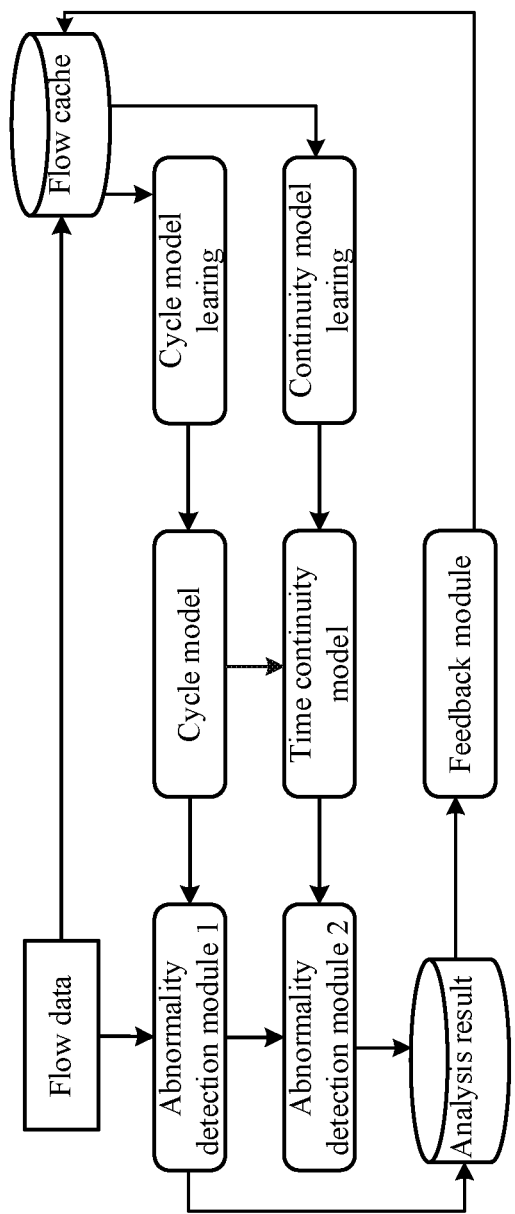
FIG. 3 is a logical block diagram illustrating a method of detecting flow abnormality according to exemplary embodiments of the present disclosure.

Since each historical flow deviation value is determined based on the difference between the historical flow size corresponding to each historical time period and the corresponding flow mean value, in this embodiment, the corresponding flow mean value may be determined by the flow-size probability distribution function in the cycle model. Therefore, the time continuity model may be established based on the cycle model, as shown in FIG. 3. It should be noted that in the steps of establishing the time continuity model, the flow cache shown in FIG. 3 refers to the historical flow size corresponding to each historical time period.

At step 210, the flow deviation value corresponding to the preset time period within the current time cycle is predicted based on the obtained flow deviation value fitting curve.

At step 211, a second normal-value range is determined based on the predicted flow deviation value and the flow mean value corresponding to the preset time period determined in the step 203.

In this embodiment, the flow mean value used to determine the first normal-value range in the step 203 may be used as the flow mean value used to determine the second normal-value range, and the second normal-value range may be determined based on the flow mean value and the obtained flow deviation value.

For example, assuming that the second normal-value range is represented by "Y", the flow mean value corresponding to the preset time period determined in the step 203 is represented by "a", and the predicted flow deviation value is represented by "c", then the second normal-value range Y may be [a−c, a+c]. For example, assuming that the "a" obtained in the step 203 is 4.6, and the predicted "c" is 0.3, then the obtained second normal-value range is [4.6−0.3, 4.6+0.3], that is, 4.3~4.9.

Similar to the first normal-value range, when the second normal-value range is determined, an adjustment parameter may also be applied to the flow deviation value. Assuming that the adjustment parameter is "k", the second normal-value range Y may be [a−λ*c, a+λ*c].

At step 212, the flow size corresponding to the preset time period within the current time cycle for the execution device is obtained.

At step 213, if the obtained flow size corresponding to the preset time period does not match either of the first normal-value range and the second normal-value range, it is determined that the flow size obtained (received) within the preset time period is abnormal.

In some embodiments, the obtained flow size is an abnormal flow size when the obtained flow size is neither within the first normal-value range nor within the second normal-value range. For example, assuming that the determined first normal-value range is "4.2~4.6", and the determined second normal-value range is the same as that in the example in the step 211, namely "4.3~4.9", then in this determination method, when the obtained flow size is not within the range of "4.2~4.9", it is determined that the flow size obtained within the preset time period is an abnormal flow size. For example, referring to FIG. 3, an analysis result may be obtained by an abnormality detection module 1 and/or an abnormality detection module 2.

In addition, the obtained flow size is an abnormal flow size when the obtained flow size is "out of the first normal-value range". For example, as long as the obtained flow size is not within the range of "4.2~4.6", it may be determined that the obtained flow size within the preset time period is an abnormal flow size. Alternatively, the obtained flow size is an abnormal flow size when the obtained flow size is "not within the second normal-value range". For example, as long as the obtained flow size is not within the range of "4.3~4.9", it may be determined that the obtained flow size within the preset time period is an abnormal flow size. Alternatively, the obtained flow size is an abnormal flow size when the obtained flow size is "not within the intersection of the first normal-value range and the second normal-value range". For example, as long as the obtained flow size is not within the range of "4.3~4.6", it may be determined that the obtained flow size within the preset time period is an abnormal flow size.

In some embodiments, when the flow size obtained (received) within the preset time period is a normal flow size, the flow-size probability distribution function corresponding to the preset time period may be updated based on the value of the normal flow size for subsequently determining whether the flow size obtained in the preset time period within the next time cycle is an abnormal flow size based on the updated flow-size probability distribution function. For example, the cycle model may be updated through a feedback module shown in FIG. 3. It should be emphasized that the updating process includes updating the flow-size probability distribution function corresponding to the preset time period based on the flow size corresponding to the preset time period. In this case, the flow cache in FIG. 3 refers to the flow size corresponding to the preset time period within the current time cycle.

It can be seen from the foregoing embodiments that the method of detecting abnormal flow according to some embodiments of the present disclosure may determine the first normal-value range for the flow size corresponding to the preset time period based on historical data, and may determine the second normal-value range by using the characteristic of continuity among historical deviation values corresponding to consecutive time periods. Then, based on a relationship between the flow size obtained by the execution device in the preset time period within the current time cycle and the first and/or second normal-value range, it may be determined whether the flow size obtained in the preset time period is an abnormal flow size.

In addition, in some embodiments, the first normal-value range and the second normal-value range are determined through a pre-established cycle model. The cycle model includes only the probability distribution function obtained from historical data, and does not include a large amount of historical data, so that there is no need to allocate a large amount of storage space for storing historical data, thereby the storage space occupation of the execution device is reduced.

Next, the target object being a CPU temperature of the target device and the obtained value of parameter being a CPU temperature value corresponding to a preset time point are taken as an example. The method according to some embodiments of the present disclosure will be introduced.

Figure 4:
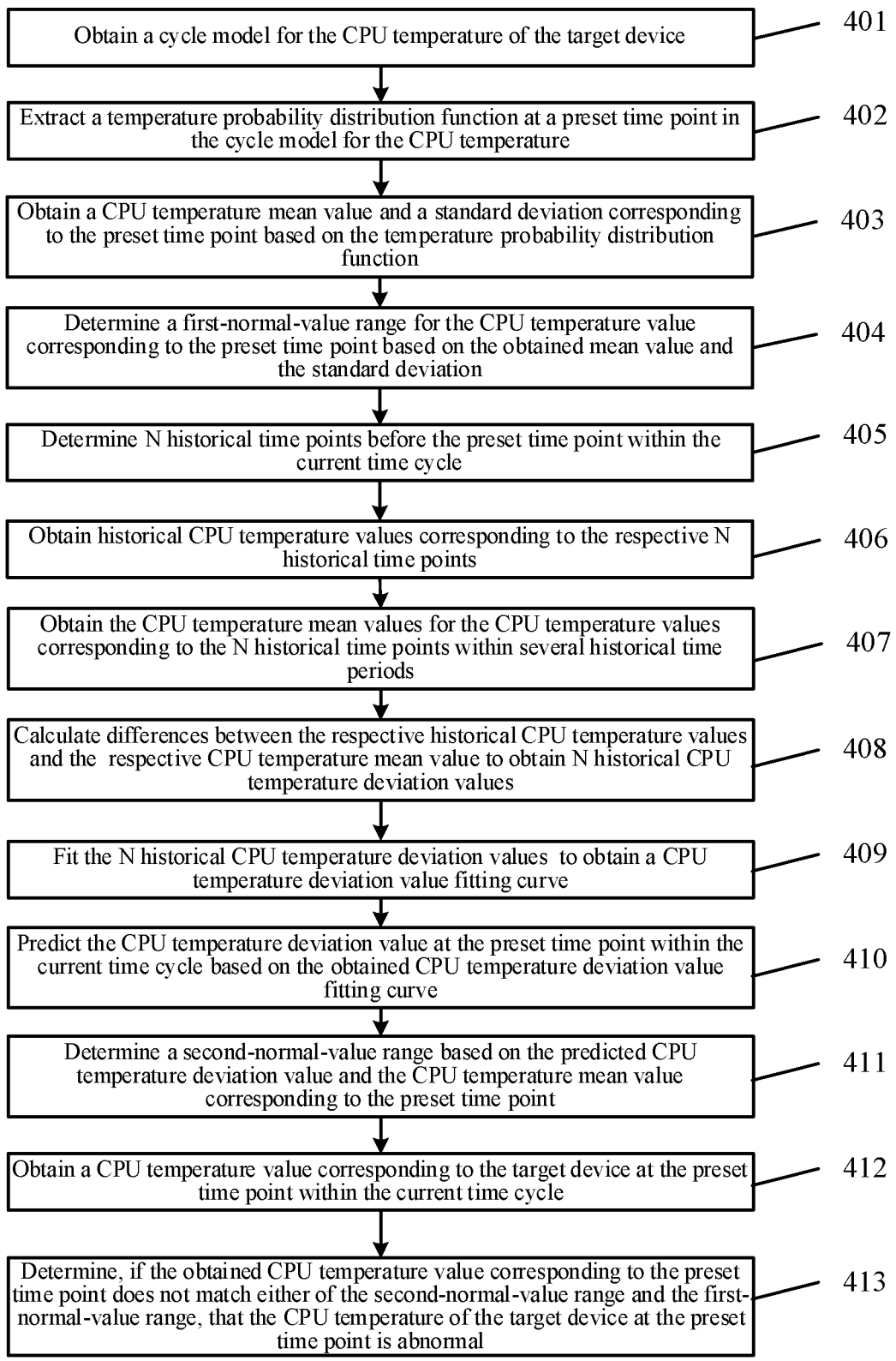
FIG. 4 is a flowchart illustrating a method of detecting an abnormal temperature of a central processing unit (CPU) according to exemplary embodiments of the present disclosure.

FIG. 4 is a flowchart illustrating a method of detecting an abnormal temperature of a CPU according to exemplary embodiments of the present disclosure. This method may be applied to an electronic device. The method may include steps 401 to 413, most of which are similar to corresponding steps of the method described above with reference to FIG. 2 and therefore will not be described in detail for the sake of brevity.

At step 401, a cycle model for the CPU temperature of the target device is obtained.

A difference from the foregoing embodiment of the method of detecting flow abnormality is that the cycle model for the CPU temperature includes probability distribution functions for the CPU temperature at several time points within historical time cycles. For example, the 24 hours may be used as a time cycle and each hour is used as a time point. Whenever the execution device arrives at a time point, the CPU temperature of the target device at the time point may be detected to determine whether the CPU temperature is abnormal. Of course, the time points in each time cycle may also be increased or decreased in light of actual needs.

At step 402, a temperature probability distribution function at a preset time point in the cycle model for the CPU temperature is extracted.

In this embodiment, the preset time point in this step may be regarded as that whenever a preset time point is reached, this time point may be determined as the preset time point.

At step 403, a CPU temperature mean value and a standard deviation corresponding to the preset time point are obtained based on the temperature probability distribution function.

At step 404, a first normal-value range for the CPU temperature value corresponding to the preset time point is determined based on the obtained mean value and the standard deviation.

At step 405, N historical time points before the preset time point within the current time cycle are determined.

At step 406, historical CPU temperature values corresponding to the respective N historical time points are obtained.

At step 407, the CPU temperature mean values for the CPU temperature values corresponding to the N historical time points within several historical time periods are obtained.

At step 408, differences between the respective historical CPU temperature values corresponding to the N historical time points obtained in the step 406 and the respective CPU temperature mean values corresponding to the N historical time points obtained in the step 407 are calculated to obtain N historical CPU temperature deviation values.

At step 409, the N historical CPU temperature deviation values are fitted to obtain a CPU temperature deviation value fitting curve.

At step 410, the CPU temperature deviation value at the preset time point within the current time cycle is predicted based on the obtained CPU temperature deviation value fitting curve.

At step 411, a second normal-value range is determined based on the predicted CPU temperature deviation value and the CPU temperature mean value corresponding to the preset time point obtained in the step 403.

At step 412, a CPU temperature value corresponding to the target device at the preset time point within the current time cycle is obtained.

At step 413, if the obtained CPU temperature value corresponding to the preset time point does not match either of the second normal-value range and the first normal-value range, it is determined that the CPU temperature of the target device at the preset time point is abnormal.

According to the above embodiments, the state parameters of the target device may be detected to know the operating (or running) state of the target device in real time.

Figure 5:
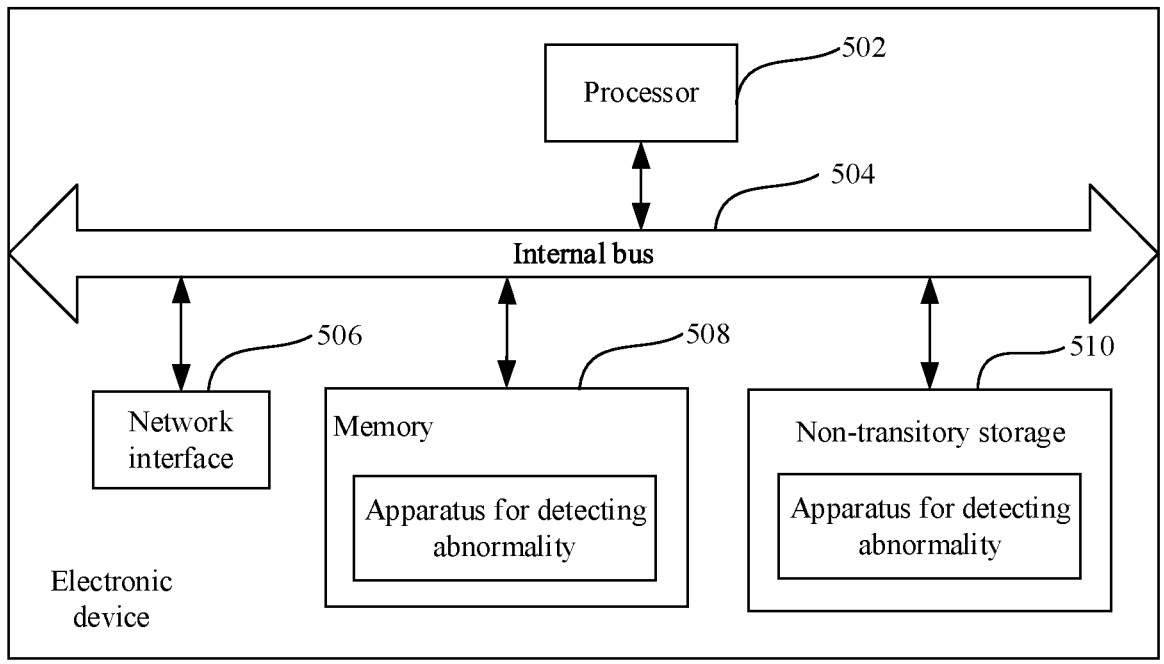
FIG. 5 is a block diagram illustrating an electronic device according to exemplary embodiments of the present disclosure.

FIG. 5 is a block diagram illustrating an electronic device according to exemplary embodiments of the present disclosure. The electronic device may include a processor 502, an internal bus 504, a network interface 506, a memory 508, and a non-transitory storage 510. The processor 502 may read a computer program from the non-transitory storage 510 to the memory 508 and then execute it. An abnormality detection apparatus is formed at a logical level so as to implement the method of detecting abnormality according to any one of the above embodiments.

Figure 6:
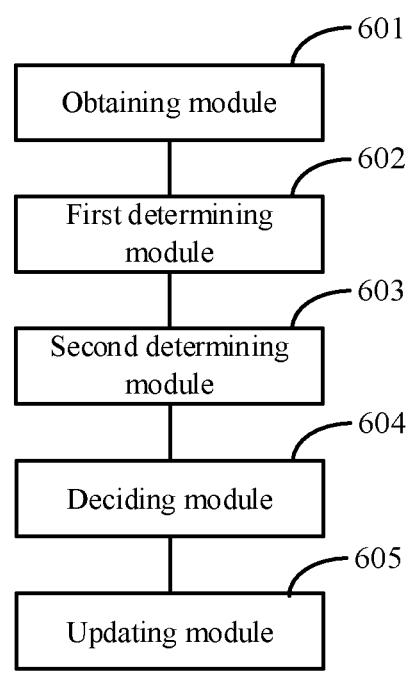
FIG. 6 is a block diagram illustrating an apparatus for detecting abnormality according to exemplary embodiments of the present disclosure.

FIG. 6 is a block diagram illustrating an apparatus for detecting abnormality according to exemplary embodiments of the present disclosure. The apparatus for detecting abnormality may include an obtaining module 601, a first determining module 602, a second determining module 603, a deciding module 604, and an updating module 605.

The obtaining module 601 may obtain a value of a parameter for a target object in a preset time period or at a preset time point within a current time cycle.

The first determining module 602 may determine a first normal-value range corresponding to the obtained value of the parameter, where the first normal-value range is determined by historical values of the parameter for the target object in the preset time period or at the preset time point within historical time cycles.

The second determining module 603 may determine a second normal-value range corresponding to the obtained value of the parameter, where the second normal-value range is defined by an intermediate value and a deviation value for the target object in the preset time period or at the preset time point. The intermediate value may be determined by the historical values of the parameter for the target object in the preset time period or at the preset time point within historical time cycles. The deviation value may be obtained by prediction based on historical deviation values for the target object in a preset number of historical time periods or at a preset number of history time points before the preset time period or the preset time point within the current time cycle. A historical deviation value for the target object in each historical time period or at each history time point may be a difference between a first historical value of the parameter and a first intermediate value for the target object in the historical time period or at the historical time point.

The deciding module 604 may determine, in response to determining that the obtained value of the parameter does not match either of the first normal-value range and the second normal-value range, that the target object is abnormal.

In some embodiments, the first determining module 602 may be further configured to: obtain a cycle model corresponding to the target object, where the cycle model is established based on the historical values of the parameter for the target object in historical time cycles; determine the first normal-value range based on the obtained cycle model.

In some embodiments, the updating module 605 may update the cycle model based on the obtained value of the parameter upon determining that the target object is normal.

In some embodiments, the cycle model includes a parameter-value probability distribution function corresponding to each time period or time point. The first determining module 602 may be further configured to: extract a parameter-value probability distribution function corresponding to the preset time period or the preset time point from the cycle model; determine a standard deviation and a mean value for the value of the parameter based on the parameter-value probability distribution function, and obtain the first normal-value range based on the standard deviation and the mean value.

In some embodiments, the target object includes one of the following: a flow or a data packet received by a preset host, a flow or a data packet from a preset host, a flow or a data packet received by a preset application in the preset host, a flow or a data packet from the preset application in the preset host, or any one of state parameters of the preset host.

In some embodiments, the value of the parameter for the target object includes one of the following: a total value of flows or a number of data packets received by the preset host, a total value of flows or a number of data packets from the preset host, a total value of flows or a number of data packets received by the preset application in the preset host, a total value of flows or a number of data packets from the preset application in the preset host, a value of any one of state parameters of the preset host, a number of packets retransmissions or losses upon the preset host sending data, a number of connections for the preset host's Internet Protocol (IP) address as a source IP address, a number of connections for the preset host's IP address as a destination IP address, a maximum number of connections with a same source port for which the preset host's IP address functions as a destination IP address, and a maximum number of connections with a same destination port for which the preset host's IP address functions as a source IP address.

In some embodiments, the deviation value is obtained in the following manner: obtaining the historical deviation values for the target object in a preset number of historical time periods or historical time points before the preset time period or the preset time point; fitting the obtained historical deviation values to form a fitting curve; predicting the deviation value for the target object in the preset time period or at the preset time point based on the fitting curve.

For the apparatus embodiments, since it basically corresponds to the method embodiments, the relevant part may refer to the part of the description of the method embodiment. The apparatus embodiments described above are merely illustrative. The modules described as separate components may or may not be physically separated, and the components displayed as modules may or may not be physical modules, that is, they may be located in one place, or it may be distributed to multiple network modules. Some or all of the modules may be selected according to actual needs to achieve the objectives of the solutions of the present disclosure. Those of ordinary skill in the art may understand and implement it without creative work.

In exemplary embodiments, there is also provided a non-transitory computer readable storage medium including instructions, such as a memory including instructions. The above instructions may be executed by a processor to implement the method of detecting abnormality according to some of the above embodiments. The non-transitory computer readable storage medium may be a read only memory (ROM), a random access memory (RAM), a CD-ROM, a magnetic tape, a floppy disk, an optical data storage device, etc.

The above are only some embodiments of the present disclosure, and are not used to limit the present disclosure. Any modification, equivalent replacement, improvement, etc. made within the principles of the present disclosure shall be included in the scope of the present disclosure.

The invention claimed is:

1. A method of detecting abnormality, being applied on an electronic device, comprising:
   obtaining, by a processor of the electronic device, a value of a parameter for a target object in a preset time period or at a preset time point within a current time cycle;

wherein the target object comprises one of: a flow or a data packet received by a preset host, a flow or a data packet from the preset host, a flow or a data packet received by a preset application in the preset host, a flow or a data packet from the preset application in the preset host, or any one of state parameters for the preset host; and the value of the parameter for the target object comprises one of: a total value of flows or a number of data packets received by the preset host, a total value of flows or a number of data packets from the preset host, a total value of flows or a number of data packets received by a preset application in the preset host, a total value of flows or a number of data packets from a preset application in the preset host, a value of any one of state parameters for the preset host, a number of packets retransmissions or losses upon the preset host sending data, a number of connections for the preset host's Internet Protocol (IP) address as a source IP address, a number of connections for the preset host's IP address as a destination IP address, a maximum number of connections with a same source port for which the preset host's IP address functions as a destination IP address, or a maximum number of connections with a same destination port for which the preset host's IP address functions as a source IP address;

determining, by the processor, a first normal-value range corresponding to the obtained value of the parameter, wherein the first normal-value range is determined by historical values of the parameter for the target object in the preset time period or at the preset time point within historical time cycles;

determining, by the processor, a second normal-value range corresponding to the obtained value of the parameter, wherein the second normal-value range is defined by an intermediate value and a deviation value for the target object in the preset time period or at the preset time point, the intermediate value is determined by the historical values of the parameter, the deviation value is obtained by prediction based on historical deviation values for the target object in a preset number of historical time periods or at a preset number of history time points before the preset time period or the preset time point within the current time cycle, each of the historical deviation values for the target object in each of the historical time periods or at each of the history time points is a difference between a first historical value of the parameter and a first intermediate value for the target object in the historical time period or at the historical time point; and determining, by the processor, in response to determining that the obtained value of the parameter does not match either of the first normal-value range and the second normal-value range, that the target object is abnormal, thereby identifying and preventing network attacks, and implementing state monitoring of the preset host;

wherein determining, by the processor, the first normal-value range corresponding to the obtained value of the parameter comprises:

extracting, by the processor, a parameter-value probability distribution function corresponding to the preset time period or the preset time point from a cycle model corresponding to the target object, wherein the cycle model is established based on the historical values of the parameter for the target object in the historical time cycles, and the cycle model comprises a parameter-value probability distribution function corresponding to each time period or time point of a plurality of time periods or time points; and determining, by the processor, a standard deviation and a mean value for the value of the parameter based on the extracted parameter-value probability distribution function, and obtaining the first normal-value range based on the standard deviation and the mean value.

2. The method according to claim 1, further comprising, updating, by the processor, in response to determining that the target object is normal, the cycle model based on the obtained value of the parameter.

3. The method according to claim 1, wherein obtaining, by the processor, the deviation value comprises:
   obtaining, by the processor, the historical deviation values;
   fitting, by the processor, the obtained historical deviation values to form a fitting curve; and
   predicting, by the processor, the deviation value for the target object in the preset time period or at the preset time point based on the fitting curve.

4. An electronic device, comprising:
   a processor; and
   a memory for storing instructions that are executable by the processor to perform operations comprising:
      obtaining a value of a parameter for a target object in a preset time period or at a preset time point within a current time cycle; wherein the target object comprises one of: a flow or a data packet received by a preset host, a flow or a data packet from the preset host, a flow or a data packet received by a preset application in the preset host, a flow or a data packet from the preset application in the preset host, or any one of state parameters for the preset host; and the value of the parameter for the target object comprises one of: a total value of flows or a number of data packets received by the preset host, a total value of flows or a number of data packets from the preset host, a total value of flows or a number of data packets received by a preset application in the preset host, a total value of flows or a number of data packets from a preset application in the preset host, a value of any one of state parameters for the preset host, a number of packets retransmissions or losses upon the preset host sending data, a number of connections for the preset host's Internet Protocol (IP) address as a source IP address, a number of connections for the preset host's IP address as a destination IP address, a maximum number of connections with a same source port for which the preset host's IP address functions as a destination IP address, or a maximum number of connections with a same destination port for which the preset host's IP address functions as a source IP address;
      determining a first normal-value range corresponding to the obtained value of the parameter, wherein the first normal-value range is determined by historical values of the parameter for the target object in the preset time period or at the preset time point within historical time cycles;
      determining a second normal-value range corresponding to the obtained value of the parameter, wherein the second normal-value range is defined by an intermediate value and a deviation value for the target object in the preset time period or at the preset time point, the intermediate value is determined by the historical values of the parameter, the deviation value is obtained by prediction based on historical deviation values for the target object in a preset number of historical time periods or at a preset number of history time points before the preset time period or the preset time point within the current time cycle, each of the historical deviation values for the target object in each of the historical time periods or at each of the history time points is a difference between a first historical value of the parameter and a first intermediate value for the target object in the historical time period or at the historical time point; and determining, in response to determining that the obtained value of the parameter does not match either of the first normal-value range and the second normal-value range, that the target object is abnormal, thereby identifying and preventing network attacks, and implementing state monitoring of the preset host;

wherein determining the first normal-value range corresponding to the obtained value of the parameter comprises:

extracting, by the processor, a parameter-value probability distribution function corresponding to the preset time period or the preset time point from a cycle model corresponding to the target object, wherein the cycle model is established based on the historical values of the parameter for the target object in the historical time cycles, and the cycle model comprises a parameter-value probability distribution function corresponding to each time period or time point of a plurality of time periods or time points; and determining, by the processor, a standard deviation and a mean value for the value of the parameter based on the extracted parameter-value probability distribution function, and obtaining the first normal-value range based on the standard deviation and the mean value.

5. The electronic device according to claim 4, wherein the processor further performs operations comprising:

updating, in response to determining that the target object is normal, the cycle model based on the obtained value of the parameter.

6. The electronic device according to claim 4, wherein obtaining the deviation value comprises:

obtaining the historical deviation values;

fitting the obtained historical deviation values to form a fitting curve; and predicting the deviation value for the target object in the preset time period or at the preset time point based on the fitting curve.

7. A non-transitory computer-readable storage medium having computer instructions stored thereon, wherein the computer instructions are executable by a processor to perform operations comprising:

obtaining a value of a parameter for a target object in a preset time period or at a preset time point within a current time cycle; wherein the target object comprises one of: a flow or a data packet received by a preset host, a flow or a data packet from the preset host, a flow or a data packet received by a preset application in the preset host, a flow or a data packet from the preset application in the preset host, or any one of state parameters for the preset host; and the value of the parameter for the target object comprises one of: a total value of flows or a number of data packets received by the preset host, a total value of flows or a number of data packets from the preset host, a total value of flows or a number of data packets received by a preset application in the preset host, a total value of flows or a number of data packets from a preset application in the preset host, a value of any one of state parameters for the preset host, a number of packets retransmissions or losses upon the preset host sending data, a number of connections for the preset host's Internet Protocol (IP) address as a source IP address, a number of connections for the preset host's IP address as a destination IP address, a maximum number of connections with a same source port for which the preset host's IP address functions as a destination IP address, or a maximum number of connections with a same destination port for which the preset host's IP address functions as a source IP address;

determining a first normal-value range corresponding to the obtained value of the parameter, wherein the first normal-value range is determined by historical values of the parameter for the target object in the preset time period or at the preset time point within historical time cycles;

determining a second normal-value range corresponding to the obtained value of the parameter, wherein the second normal-value range is defined by an intermediate value and a deviation value for the target object in the preset time period or at the preset time point, the intermediate value is determined by the historical values of the parameter, the deviation value is obtained by prediction based on historical deviation values for the target object in a preset number of historical time periods or at a preset number of history time points before the preset time period or the preset time point within the current time cycle, each of the historical deviation values for the target object in each of the historical time periods or at each of the history time points is a difference between a first historical value of the parameter and a first intermediate value for the target object in the historical time period or at the historical time point; and determining, in response to determining that the obtained value of the parameter does not match either of the first normal-value range and the second normal-value range, that the target object is abnormal, thereby identifying and preventing network attacks, and implementing state monitoring of the preset host;

wherein determining the first normal-value range corresponding to the obtained value of the parameter comprises:

extracting, by the processor, a parameter-value probability distribution function corresponding to the preset time period or the preset time point from a cycle model corresponding to the target object, wherein the cycle model is established based on the historical values of the parameter for the target object in the historical time cycles, and the cycle model comprises a parameter-value probability distribution function corresponding to each time period or time point of a plurality of time periods or time points; and determining, by the processor, a standard deviation and a mean value for the value of the parameter based on the extracted parameter-value probability distribution function, and obtaining the first normal-value range based on the standard deviation and the mean value.

8. The non-transitory storage medium according to claim 7, wherein the computer instructions are executable by the processor to further perform operations comprising:

updating, in response to determining that the target object is normal, the cycle model based on the obtained value of the parameter.

9. The non-transitory storage medium according to claim 7, wherein obtaining the deviation value comprises:

obtaining the historical deviation values;

fitting the obtained historical deviation values to form a fitting curve; and predicting the deviation value for the target object in the preset time period or at the preset time point based on the fitting curve.

* * * * *